United States Patent [19]

John

[11] Patent Number: 5,043,572

[45] Date of Patent: Aug. 27, 1991

[54] OPTICAL PYROMETER INCLUDING FIBER OPTIC AND SILICON MICROSTRUCTURE

[75] Inventor: Laurence N. John, London, England

[73] Assignee: Smiths Industries Public Limited Company, London, England

[21] Appl. No.: 562,916

[22] Filed: Aug. 6, 1990

[51] Int. Cl.⁵ .............................................. H01J 5/16
[52] U.S. Cl. .......................... 250/227.11; 250/227.21; 250/351
[58] Field of Search ...................... 250/227.11, 227.21, 250/232, 351; 356/216, 225; 73/862.59

[56] References Cited

U.S. PATENT DOCUMENTS 4,743,752  5/1988  Olsen et al. ......................... 250/227
4,955,979  9/1990  Denayrolles et al. ............... 374/131
4,972,076 11/1990  Willson ........................ 250/227.21

Primary Examiner—David C. Nelms
Assistant Examiner—John R. Lee
Attorney, Agent, or Firm—Pollock, VandeSande and Priddy

[57] ABSTRACT

A pyrometer or other optical system has a silicon microstructure with a beam that is vibrated by optical radiation from an alternating source. The beam alternately blocks and passes radiation supplied to a photodiode from an optically emissive region. A sample and hold circuit receives the output of the photodiode and provides two simultaneous signals representative of the output of the photodiode when radiation is passed to the photodiode and blocked from the photodiode respectively. A processor measures the difference between the two signals and provides an output representative of the temperature of the optically emissive region.

10 Claims, 5 Drawing Sheets

OPTICAL PYROMETER INCLUDING FIBER OPTIC AND SILICON MICROSTRUCTURE

BACKGROUND OF THE INVENTION

This invention relates to optical systems.

Optical systems are increasingly being used in place of electrical systems for sensing and transmission of data. Such systems may comprise, for example, an optical sensor, a fibre-optic cable and a detector that provides an output representative of the variable sensed by the sensor in accordance with the amplitude of radiation received via the cable. One problem with such analogue systems is that some of their characteristics can drift with changes in temperature and can become especially insensitive at low radiation levels.

BRIEF SUMMARY OF THE INVENTION

It is an object of the present invention to provide an optical system that can be used to overcome this disadvantage.

According to one aspect of the present invention there is provided an optical system for measuring the amplitude of an optical radiation signal transmitted along an optical radiation path including detector means responsive to radiation along the path, the system including a silicon microstructure located in the path, means for vibrating the silicon microstructure such as to modulate radiation transmitted to the detector means between alternate different amplitudes such that the detector means provides an output signal that alternates between two values representative of the different amplitudes of radiation, and means responsive to the difference between the two values of the output signal to provide an output representative of the amplitude of the optical radiation signal.

In this way, the radiation supplied to the detector means may be alternately blocked and passed so that, by measuring the difference in the two outputs of the detector the radiation level is repeatedly referenced to the latest dark detector characteristics, thereby making the system immune from drift in characteristics of the detector.

The means for vibrating the silicon microstructure preferably includes a source of alternating optical radiation and means for directing the alternating optical radiation on the silicon microstructure such as optically to drive the silicon microstructure to vibrate. The detector means may provide an electrical output to a sample-and-hold circuit, the sample-and-hold circuit being arranged to provide two simultaneous signals representative of the two different amplitudes of radiation respectively. The silicon microstructure may include a beam, the means for vibrating the silicon microstructure effecting vibration of the beam such that it alternately blocks and passes radiation transmitted along the optical radiation path to the detector means. The beam may be supported at one end only, or at both ends and be vibrated to flex at a point between its supported ends. The detector means may be a photodiode, the photodiode being formed integrally with the silicon microstructure. The source of alternating optical radiation may be formed integrally with the silicon microstructure. The sample-and-hold circuit may be formed integrally with the silicon microstructure.

The system may include a plurality of silicon microstructures each of which is located in a respective optical path, the detector means being responsive to radiation along each of the respective optical radiation paths, and the silicon microstructures being vibrated such that at any time radiation from no more than one of the paths is passed to the detector means.

According to another aspect of the present invention there is provided an optical pyrometer system including an optical system according to the above one aspect of the present invention, the optical radiation path including a fibre-optic cable that extends to an optically emissive region, and the system including a processor arranged to provide an output signal representative of the temperature of the optically emissive region.

An optical pyrometer system in accordance with the present invention, will now be described, by way of example, with reference to the accompanying drawings.

DETAILED DESCRIPTION OF THE PREFERRED EMBODIMENTS

Figure 1:
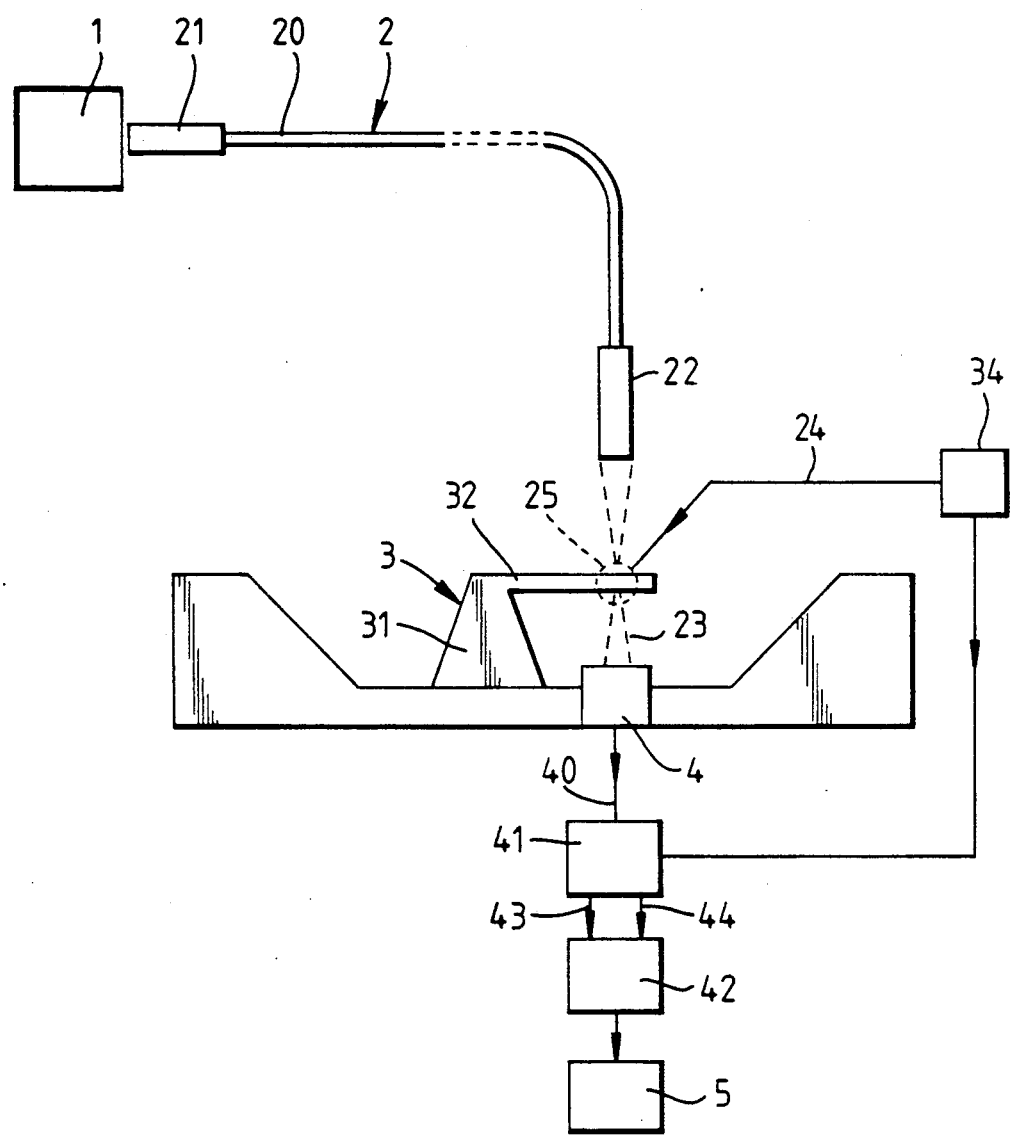
FIG. 1 is a side elevation view of the system.
Figure 2:
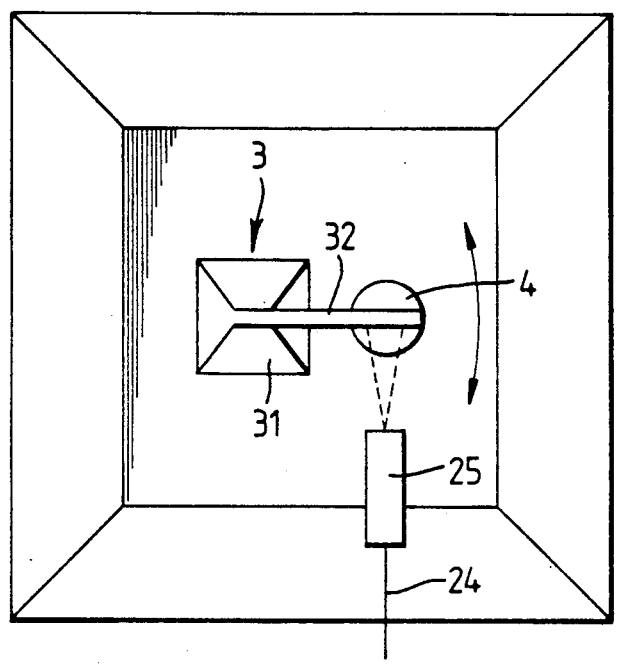
FIG. 2 is a plan view of a part of the system.

With reference first to FIGS. 1 and 2, the optical system illustrated is a pyrometer system for sensing the temperature of an optically-emissive region or chamber 1. The system includes an optical radiation path 2 that supplies radiation from the chamber 1 via a silicon microstructure 3 to a detector 4 which in turn provides an electrical output to a display 5 representative of the amplitude of radiation incident on the detector 4.

The optical radiation path 2 includes a fibre-optic cable 20 with a high temperature-resistant converging lens 21 at its forward end which focusses radiation emitted by the chamber 1 into the cable. At its rear end, the cable 20 has a converging lens 22 which directs radiation emergent from the cable onto the detector which takes the form of a photodiode 4. An air gap 23 is provided between the rear lens 22 and the photodiode 4 and within this is located the silicon microstructure 3.

The silicon microstructure 3 is a unitary, one-piece structure etched from a block 30 of silicon and comprises a pillar 31 of pyramid shape which supports a horizontal cantilever beam 32 that extends within the path of radiation from the rear lens 22 to the photodiode 4. Mounted to one side of the beam 32 is a second optical fibre 24 which extends to a drive source 34 of alternating, pulsed optical radiation which may be provided by an LED or laser diode. A lens 25, located at the end of the fibre 24, focusses a beam of radiation which is directed horizontally at right angles incident on one side of the beam 32.

The photodiode 4 may be formed integrally from the same block 30 of silicon as that from which the microstructure 3 is provided, or it may be a separate component. The electrical output from the photodiode 4 is supplied via line 40 to a sample-and-hold circuit 41 which also receives an input from the drive source 34 in synchronism with alternation of the source 34. The output from the sample and hold circuit 41 is supplied to a processor 42 via lines 43 and 44. The output from the processor 42 provides an output representative of the temperature of the chamber 1 which is supplied to the display 5 or other utilisation device.

Figure 3:
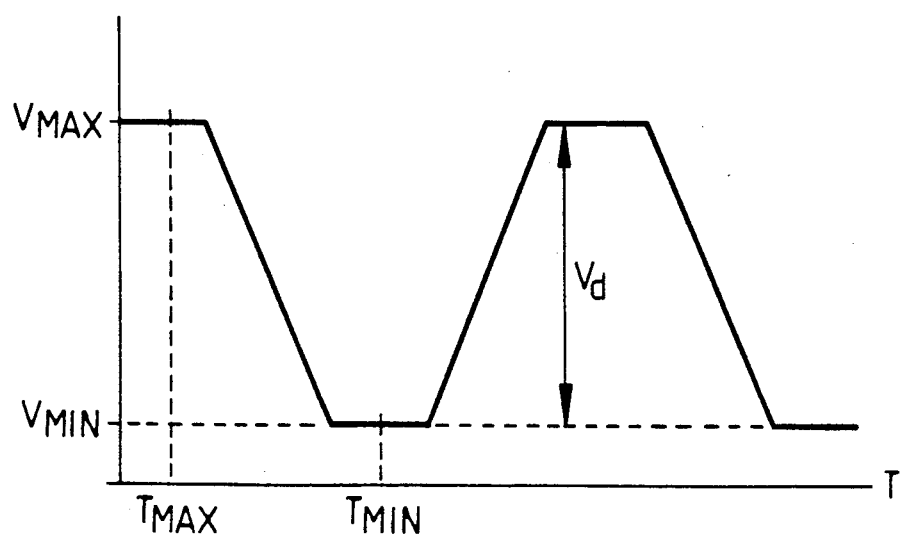
FIG. 3 is a graph illustrating the response of the system.

In operation, the radiation from the source 34 incident on the beam 32 causes it to vibrate in a horizontal plane, flexing at its point of attachment to the pillar 31. The beam 32 exhibits a high Q' value and low mass so that it is easily forced into oscillation at its resonant frequency. Radiation from the chamber 1, after transmission through the cable 20 is focussed to a point above the photodiode 4 which coincides with the equilibrium position of the oscillating beam 32. The width of the beam 32 is such that, when it is in its equilibrium position, all the radiation from the cable 20 is blocked from passing to the photodiode 4. At its two limits of oscillation, however, the beam 32 completely reveals the photodiode 4 so that it receives the maximum level of radiation. The output from the photodiode 4 thereby takes the form shown in FIG. 3, with the minimum output Vmin corresponding with the photodiode dark characteristics and being dependent on the temperature of the photodiode. The maximum output Vmax occurs once the beam 32 has completely revealed the photodiode 4.

The output is supplied to the sample-and-hold circuit 41 which is triggered by the drive source 34 to store the signals Vmax and Vmin at times T max and T min. These signals can then be sampled simultaneously on lines 43 and 44 respectively so that the processor 42 can perform a comparison operation and derive an indication of the difference Vd between Vmax and Vmin.

It will be appreciated that any changes in temperature, or any other factor influencing performance of the photodiode 4 will alter the dark characteristic and hence the values of both Vmax and Vmin in the same sense. By measuring the difference between these signals, Vd, the signal Vmax is repeatedly referenced to the photodiode dark characteristics so as to compensate for any changes in Vmin.

The silicon microstructure 3 has advantages over mechanical shutters and choppers in that it can have a higher speed, a greater reliability and a smaller size and weight. Solid state shutters made of electro-optic material the transmission properties of which vary with an applied electrical signal also have disadvantages over the silicon microstructure in that they have temperature dependent characteristics, chromatic effects and a limited contrast ratio.

That part of the system including the silicon microstructure 3, the photodiode 4, the drive source 34, the sample-and-hold circuit 41, the processor 42 and their optical and electrical interconnections may be made as a single integrated circuit requiring only a drive signal for the source 34.

Figure 4:
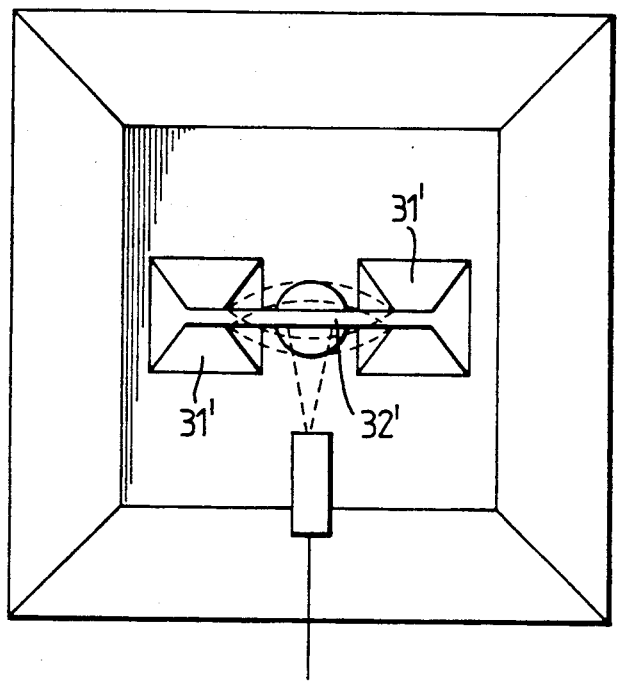
FIG. 4 is a plan view of a modified system.
Figure 5:
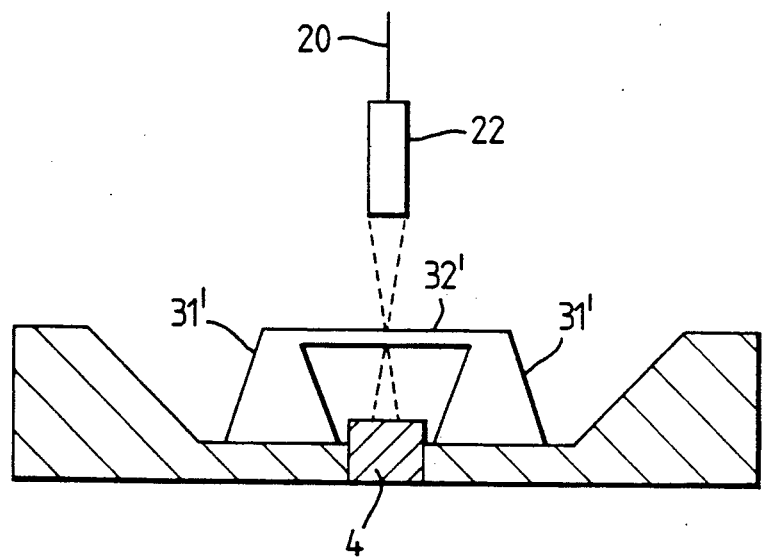
FIG. 5 is a side elevation view of the system of FIG. 4.

Various alternative arrangements of silicon microstructure are possible. FIGS. 4 and 5 show an arrangement in which the beam 32' takes the form of a bridge between two pillars 31'. Drive radiation incident on the side of the beam 32' causes it to flex between the positions shown in broken lines.

Figure 6:
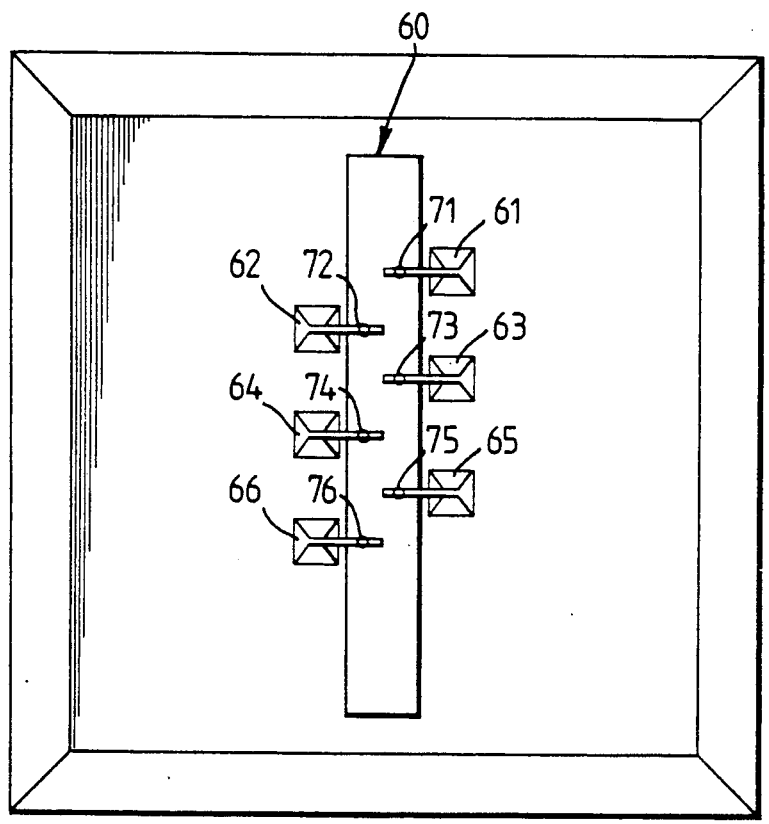
FIG. 6 is a plan view of a part of another modified system.

A multiplex system can be produced readily as shown in FIG. 6. In this arrangement, a linear photodiode 60 is exposed in sequence to one of six different radiation signals. Six silicon microstructures 61 to 66 are located above the photodiode 60 and are driven by respective drive radiation signals such that, at any time, five of the microstructures prevent radiation reaching the photodiode from respective fibres 71 to 76, located above the microstructure.

Figure 7:
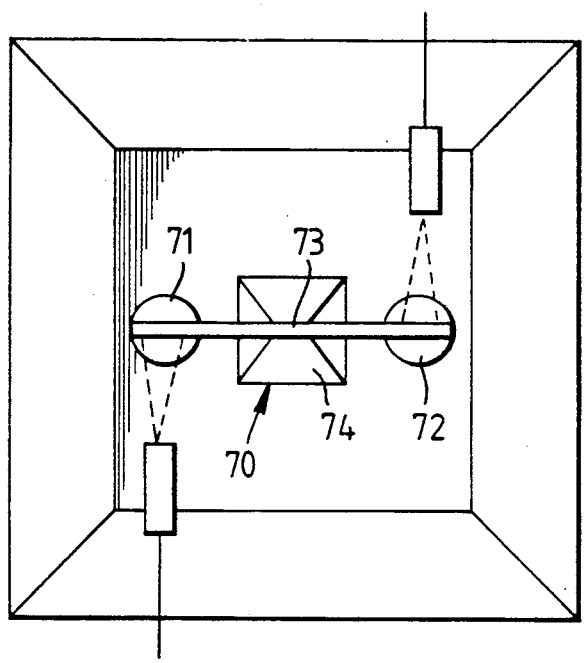
FIG. 7 is a plan view of a further modified system.
Figure 8:
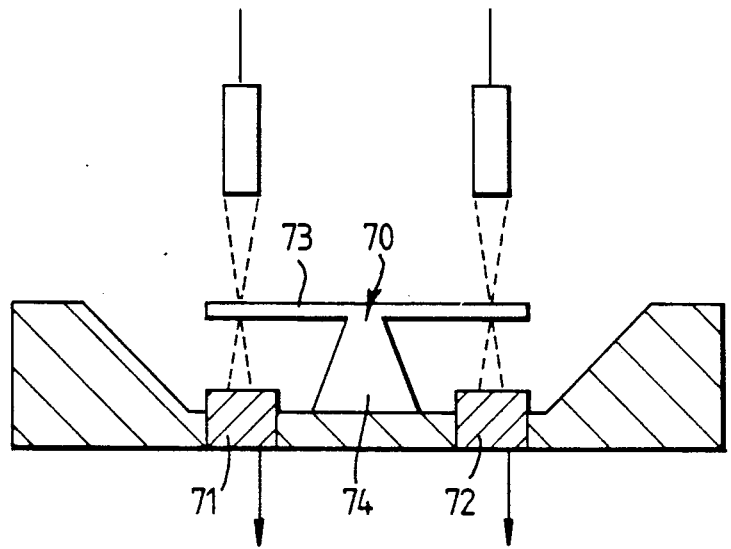
FIG. 8 is a side elevation view of the system of FIG. 7.

A system involving two photodiodes 71 and 72 is shown in FIGS. 7 and 8. In this system, the silicon microstructure 70 has a beam 73 that is mounted centrally on a pillar 74 and is driven by drive radiation to swing in a horizontal plane so that both photodiodes 71 and 72 are revealed or concealed at the same time.

Instead of driving the silicon microstructure optically, in the way described above, it could be driven electrostatically or piezoelectrically.

The system is not confined to use in pyrometry applications but can be used in any analogue system in which the amplitude of an optical radiation signal is required to be measured. The optical radiation signal may be derived from an electrical or other signal.

What I claim is:

1. An optical system of the kind for measuring the amplitude of an optical radiation signal transmitted along an optical radiation path including detector means responsive to radiation along said path, the improvement wherein the system includes a silicon microstructure located in the path, means for vibrating the silicon microstructure such as to modulate radiation transmitted to the detector means between alternate different amplitudes such that the detector means provides an output signal that alternates between two values representative of the different amplitudes of radiation, and means responsive to the difference between the two values of the output signal to provide an output representative of the amplitude of the optical radiation signal.

2. An optical system according to claim 1, wherein the means for vibrating the silicon microstructure includes a source of alternating optical radiation and an optical radiation guide for directing the alternating optical radiation on the silicon microstructure such as optically to drive the silicon microstructure to vibrate.

3. An optical system according to claim 1, including a sample-and-hold circuit, wherein the detector means provides an electrical output to the sample and hold circuit, and wherein the sample-and-hold circuit is arranged to provide two simultaneous signals representative of the two different amplitudes of radiation respectively.

4. An optical system according to claim 1, wherein the silicon microstructure includes a beam, and wherein the means for vibrating the silicon microstructure effects vibration of the beam such that it alternately blocks and passes radiation transmitted along the optical radiation path to the detector means.

5. An optical system according to claim 4, including means to support the said beam at one end only.

6. An optical system according to claim 4, including means to support the said beam at both ends, and wherein the means for vibrating the silicon microstructure causes the beam to flex at a point between its supported ends.

7. An optical system according to claim 1, wherein the detector means is a photodiode, and wherein the photodiode is formed integrally with the silicon microstructure.

8. An optical system according to claim 2, wherein the said source of alternating optical radiation is formed integrally with the silicon microstructure.

9. An optical system according to claim 1, including a plurality of silicon microstructures, a plurality of optical radiation paths, each said silicon microstructure being located in a respective optical radiation path, and means for vibrating each said silicon microstructure, wherein the said detector means is responsive to radiation along each of said optical radiation paths, and wherein the silicon microstructures are vibrated such that at any time radiation from no more than one of the paths is passed to the detector means.

10. An optical pyrometer system for measuring the temperature of an optically emissive region, the system comprising: a fibre-optic cable, one end of the fibre-optic cable extending to said optically emissive region; a detector responsive to radiation emitted by the other end of the fibre-optic cable; a radiation detector; a silicon microstructure located intermediate the detector and the said other end of the fibre-optic cable; a source of alternating optical radiation; an optical radiation guide for directing the alternating optical radiation on the silicon microstructure such as optically to drive the silicon microstructure to vibrate such that it alternately blocks and passes radiation emitted from the other end of the fibre-optic cable to the detector; and a processor that compares the output of the detector when radiation is blocked to the output of the detector when radiation is passed and provides an output representative of the temperature of the optically-emissive region.

* * * * *